(12) United States Patent
Anders et al.

(10) Patent No.: US 7,308,823 B2
(45) Date of Patent: Dec. 18, 2007

(54) TIRE PRESSURE CONTROL SYSTEM FOR A VEHICLE

(75) Inventors: Peter Otto Anders, Wolfsburg (DE); Klaus-Jürgen Gier, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/283,018

(22) Filed: Nov. 18, 2005

(65) Prior Publication Data

US 2006/0130570 A1    Jun. 22, 2006

(30) Foreign Application Priority Data

Nov. 18, 2004  (DE)  ...................... 10 2004 055 606
Feb. 16, 2005  (DE)  ...................... 10 2005 006 904

(51) Int. Cl.
*G01M 17/02*    (2006.01)

(52) U.S. Cl. ................................... 73/146; 340/426.33

(58) Field of Classification Search .................. 73/146; 340/426.33

See application file for complete search history.

(56) References Cited

U.S. PATENT DOCUMENTS

| | | | |
|---|---|---|---|
| 5,552,759 A * | 9/1996 | Stoyka | 340/426.33 |
| 6,931,920 B2 * | 8/2005 | Modawell et al. | 73/146 |
| 2004/0233050 A1 | 11/2004 | Burghardt | |
| 2004/0261510 A1 * | 12/2004 | Schulze | 73/146 |
| 2005/0011257 A1 * | 1/2005 | Modawell et al. | 73/146 |
| 2006/0196257 A1 * | 9/2006 | Shimura | 73/146 |

FOREIGN PATENT DOCUMENTS

| | | |
|---|---|---|
| DE | 101 37 591 A1 | 2/2003 |
| DE | 103 16 705 A1 | 10/2004 |

* cited by examiner

*Primary Examiner*—Andre J. Alen
(74) *Attorney, Agent, or Firm*—Manfred Beck, P.A.

(57) ABSTRACT

A tire pressure control system for determining and/or monitoring a pressure in an air-filled tire of a vehicle uses a pressure-measuring device located in the tire. The tire pressure control system includes a seat diagnosis module for checking whether the pressure-measuring device is fastened in the tire.

10 Claims, 5 Drawing Sheets

TIRE PRESSURE CONTROL SYSTEM FOR A VEHICLE

BACKGROUND OF THE INVENTION

Field of the Invention

The invention relates to a tire pressure control system for a vehicle for determining and/or monitoring a pressure in an air-filled tire of the vehicle by using a pressure-measuring device provided in the tire.

SUMMARY OF THE INVENTION

It is an object of the invention to provide a tire pressure control system for a vehicle, a method of operating a tire pressure control system, and a vehicle having a tire pressure control system, which allow to detect when the pressure-measuring device becomes detached in order to, for example, output a corresponding warning signal to a driver.

With the foregoing and other objects in view there is provided, in accordance with the invention, in combination with a vehicle having an air-filled tire, a tire pressure control system which includes:

a pressure-measuring device disposed in the air-filled tire for determining and/or monitoring a pressure in the air-filled tire; and a seat diagnosis module configured to check a fastening of the pressure-measuring device in the air-filled tire.

According to another feature of the invention, an acceleration sensor is connected to the pressure-measuring device, the acceleration sensor provides an output signal, and the seat diagnosis module checks the fastening of the pressure-measuring device in the air-filled tire in dependence of the output signal of the acceleration sensor.

According to yet another feature of the invention, the seat diagnosis module checks the fastening of the pressure-measuring device in the air-filled tire by monitoring a change in sign of the output signal of the acceleration sensor.

According to a further feature of the invention, the seat diagnosis module checks the fastening of the pressure-measuring device in the air-filled tire by comparing the output signal of the acceleration sensor to a plausibility quantity.

According to another feature of the invention, the pressure-measuring device and the acceleration sensor are embedded or potted together in a housing.

According to a further feature of the invention, the air-filled tire defines a rotation axis, the acceleration sensor is disposed in the air-filled tire such that the acceleration sensor measures an acceleration in a direction substantially radial with respect to the rotation axis of the air-filled tire.

According to another feature of the invention, the seat diagnosis module is disposed outside the air-filled tire.

With the objects of the invention in view there is also provided, a motor vehicle, including:

an air-filled tire;

a tire pressure control system including a pressure-measuring device and a seat diagnosis module;

the pressure-measuring device being disposed in the air-filled tire for determining or monitoring a pressure in the air-filled tire; and the seat diagnosis module being configured to check a fastening of the pressure-measuring device in the air-filled tire.

With the objects of the invention in view there is also provided, a method for operating a tire pressure control system, which includes the steps of:

using a pressure-measuring device disposed in an air-filled tire of a vehicle for one of determining and monitoring a pressure in the air-filled tire; and checking whether the pressure-measuring device is fastened in the air-filled tire.

According to another mode of the invention, the step of checking whether the pressure-measuring device is fastened in the air-filled tire is performed in dependence on an output signal of an acceleration sensor connected to the pressure-measuring device.

According to a further mode of the invention, the step of checking whether the pressure-measuring device is fastened in the air-filled tire is performed in dependence on an output signal of an acceleration sensor embedded together with the pressure-measuring device in a housing.

In other words, according to the invention, there is provided, a tire pressure control system for a vehicle, in particular for a motor vehicle, for determining and/or monitoring a pressure in an air-filled tire of the vehicle by using a pressure-measuring device located in the tire, wherein the tire pressure control system includes a seat diagnosis module for checking a fastening or attachment of the pressure-measuring device in the tire, in particular in dependence of an output signal of an acceleration sensor connected to the pressure-measuring device. In this manner it is possible to detect a detachment of the pressure-measuring device or a detachment of a housing connected to the pressure-measuring device early. By this early detection of a detachment of the pressure-measuring device and, respectively, a detachment of the housing connected to the pressure-measuring device, it is possible to reduce the speed of the vehicle in time such that damage to the tire by the detached pressure-measuring device and, respectively, by the detached housing connected to the pressure-measuring device, can be prevented. The pressure-measuring device (and the acceleration sensor) are in particular located in the tire in a region close to a valve.

In accordance with a preferred embodiment of the invention, the fastening of the pressure-measuring device in the tire can be checked by the seat diagnosis module by monitoring a sign change of the output signal of the acceleration sensor. In accordance with another preferred embodiment of the invention, the attachment of the pressure-measuring device in the tire can alternatively or additionally be checked with the seat diagnosis module by comparing the output signal of the acceleration sensor with a plausibility quantity. Such a plausibility quantity according to the invention is in particular the rotational speed of the tire in which the acceleration sensor is mounted, a rotational speed of another tire, the speed of the vehicle and/or the output signal of a further acceleration sensor, in particular an acceleration sensor disposed in a further tire.

In accordance with a further preferred embodiment of the invention, the pressure-measuring device and the acceleration sensor are cast or embedded together in a housing.

According to a further preferred embodiment of the invention, the acceleration sensor is disposed in the tire such that an acceleration in a direction which is substantially radial with respect to a rotation axis of the tire can be measured.

In accordance with another preferred embodiment of the invention, the seat diagnosis module is located outside the tire. In this case, the seat diagnosis module is advantageously implemented as a code in a device for monitoring a tire pressure such as the monitoring module illustrated in FIG. 2.

The above-stated object of the invention is furthermore achieved, in particular in combination with the above-described features, by a motor vehicle having a tire pressure control system for determining and/or monitoring a pressure in an air-filled tire of the vehicle by using a pressure-measuring device located in the tire, wherein the tire pressure control system includes a seat diagnosis module for checking a fastening or attachment of the pressure-measuring device in the tire, in particular in dependence on an output signal of an acceleration sensor connected to the pressure-measuring device.

The above-stated object of the invention is furthermore achieved, in particular in combination with the above-described features, by a method of operating a tire pressure control system for a vehicle for determining and/or monitoring a pressure in an air-filled tire of the vehicle by using a pressure-measuring device located in the tire, wherein, in particular in dependence on an output signal of an acceleration sensor connected to the pressure-measuring device, it is checked whether the pressure-measuring device is fastened in the tire.

Other features which are considered as characteristic for the invention are set forth in the appended claims.

Although the invention is illustrated and described herein as embodied in a tire pressure control system, it is nevertheless hot intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
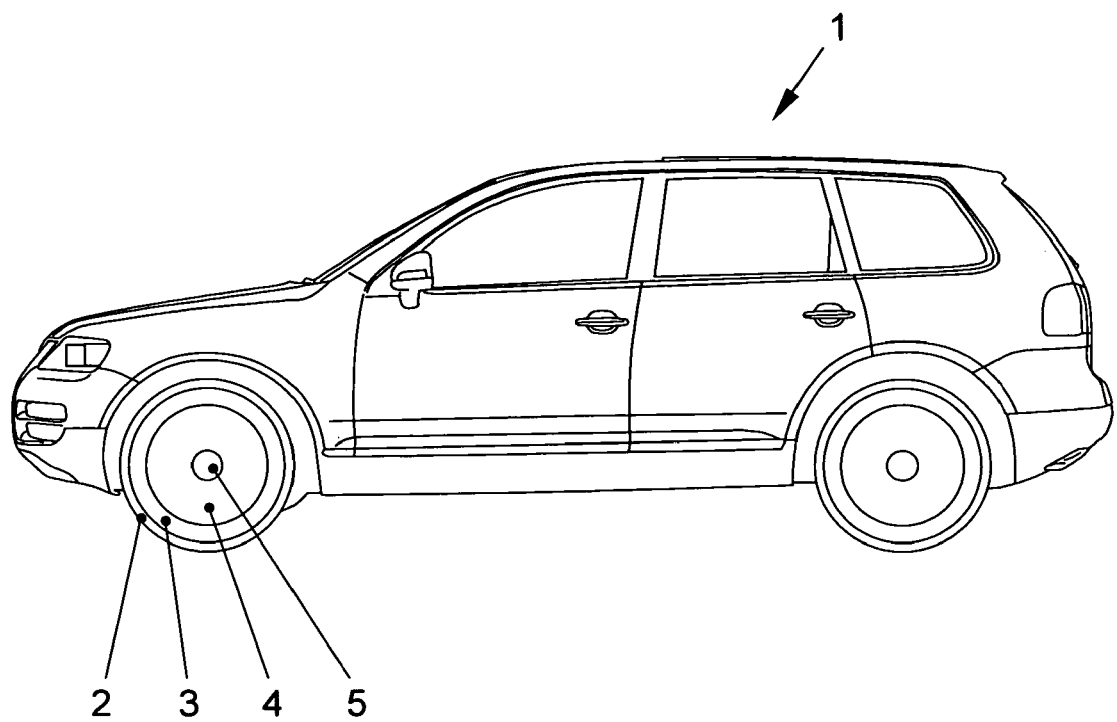
FIG. 1 is a diagrammatic side view of a motor vehicle.

Referring now to the figures of the drawings in detail and first, particularly, to FIG. 1 thereof, there is shown a motor vehicle 1. There, reference numeral 2 indicates a wheel with an air-filled tire 3 on a rim 4. The rotation axis of the wheel 2 is indicated by reference numeral 5. The motor vehicle 1 has a tire pressure control system for determining and/or monitoring a pressure in the tire 3 which pressure control system is described with reference to FIG. 2. The tire pressure control system includes a tire pressure measuring module 10 which is described with reference to FIG. 3 and which, in the present exemplary embodiment, is connected to the rim 4 in a region close to a valve 17. The tire pressure control system further includes a monitoring module 11 which is located outside the tire 3 but in or on the motor vehicle 1.

Figure 2:
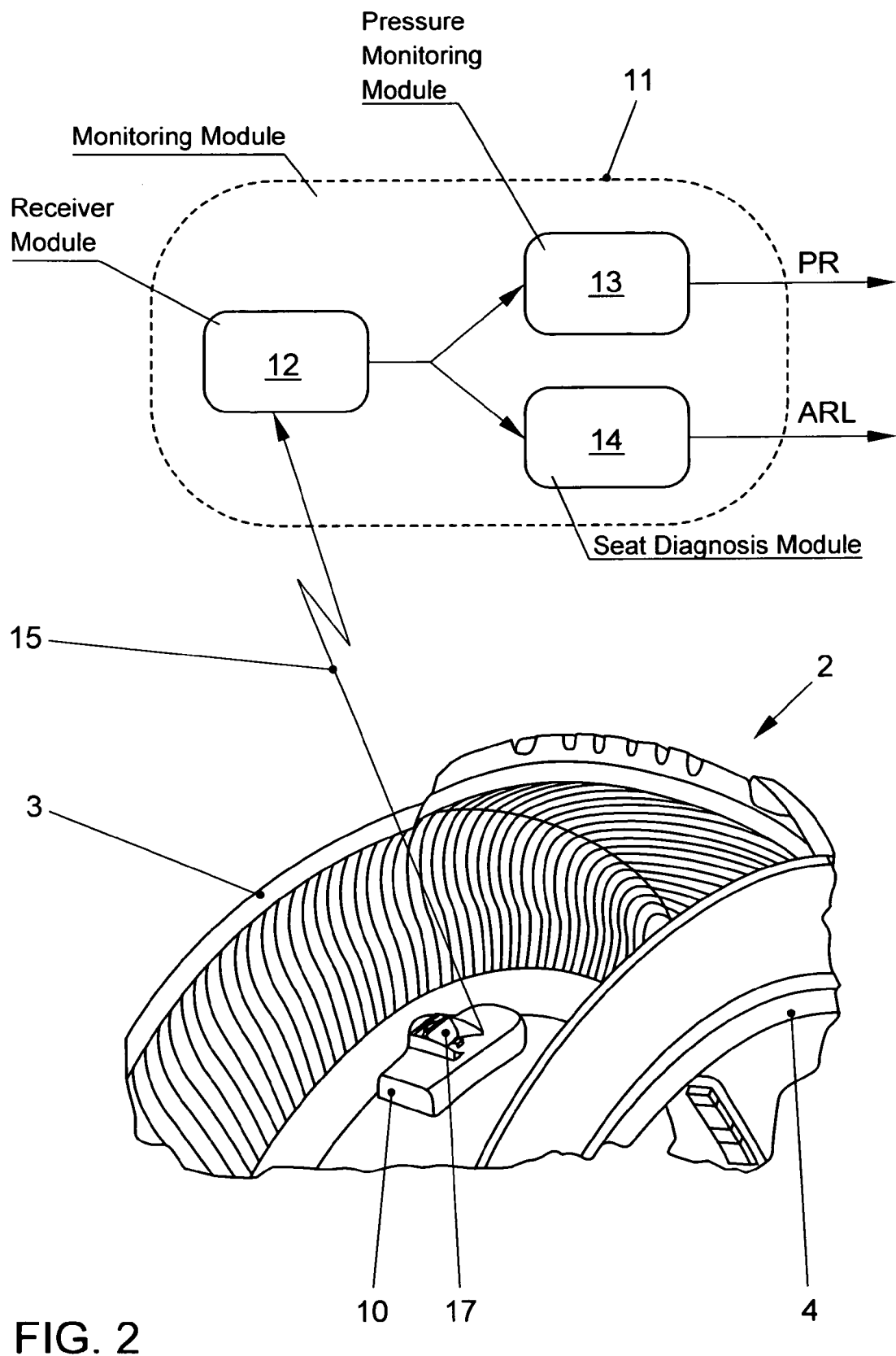
FIG. 2 is a schematic view of a tire pressure control system according to the invention.
Figure 3:
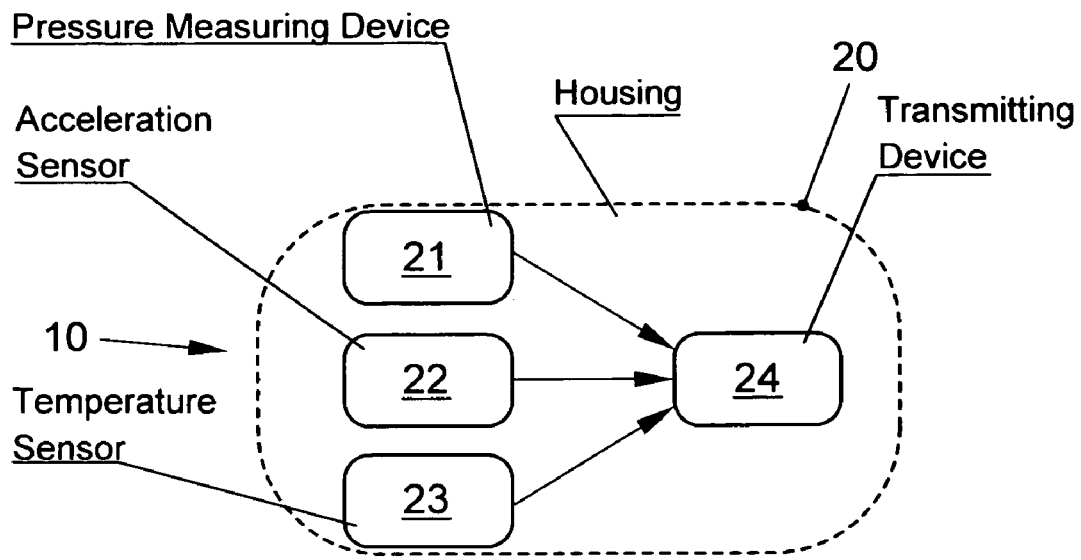
FIG. 3 is a schematic view of a tire pressure measuring module according to the invention.

The tire pressure measuring module 10, which is shown in FIG. 3, includes a pressure-measuring device 21 for measuring the pressure in the tire 3, a temperature sensor 23 for measuring a temperature in the tire 3, an acceleration sensor 22 and a battery for supplying electrical energy to the tire pressure measuring module 10. The acceleration sensor is arranged such that an acceleration in a direction substantially radial with respect to the rotation axis 5 of the tire 3 can be measured. The pressure-measuring device 21, the temperature sensor 23, the acceleration sensor 22 and the battery are embedded together with a transmitting device 24 in a housing 20 wherein the transmitting device 24 is configured for a wireless communications connection 15 as shown in FIG. 2.

Data such as the pressure in the tire 3, the temperature in the tire 3, an identification (ID) of the tire pressure measuring module 10 and an output signal of the acceleration sensor 22, which is explained with reference to FIG. 3, are sent from the tire pressure measuring module 10 to the monitoring module 11.

The monitoring module 11 includes a receiver module 12 for receiving data which are transmitted via the wireless communications connection 15 and a pressure monitoring module 13 for outputting a signal PR representing the pressure in the tire 3, wherein the signal PR is for example communicated to a display device. Alternatively or additionally, the pressure monitoring module 13 can also output a warning signal which indicates that the pressure in the tire 3 is outside a permissible tolerance range.

Figure 4:
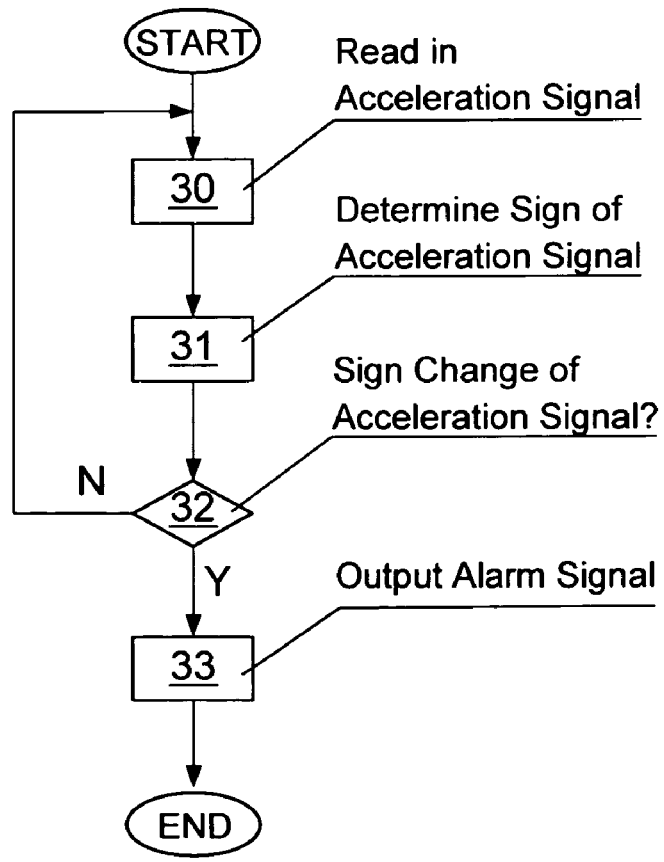
FIG. 4 is a flow chart illustrating a sequence of steps implemented in a seat diagnosis module according to the invention.

The monitoring module 11 includes furthermore a seat diagnosis module 14 for checking a fastening or attachment of the measuring module 10 in the tire 3 in dependence on the output signal of the acceleration sensor 23 which is described with reference to FIG. 3. For this purpose, the sequence or process, which is shown in exemplary manner in FIG. 4, is implemented in the seat diagnosis module 14. In this sequence, first the current output signal of the acceleration sensor 23, which signal is transmitted via the communications connection 15, is read in. Following step 30 is step 31, during which the sign of an acceleration value is determined in accordance with the output signal of the acceleration sensor 23.

Figure 5:
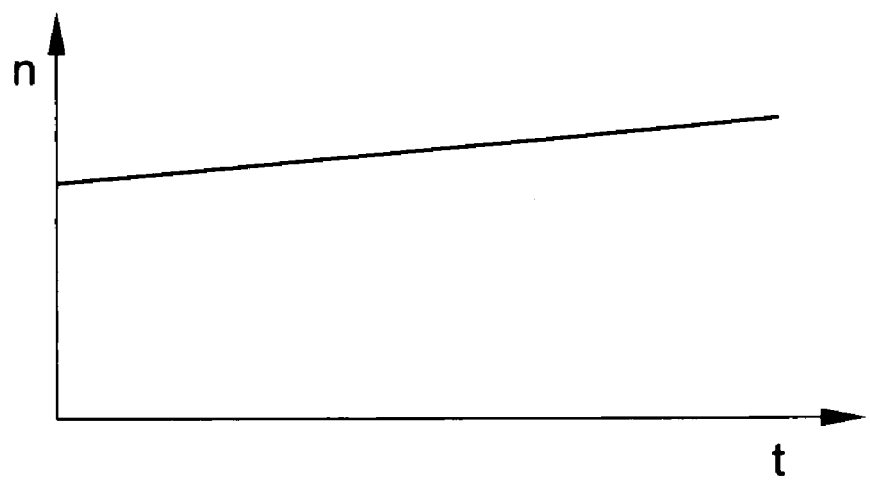
FIG. 5 is a graph illustrating a rotational speed of a tire over time.
Figure 6:
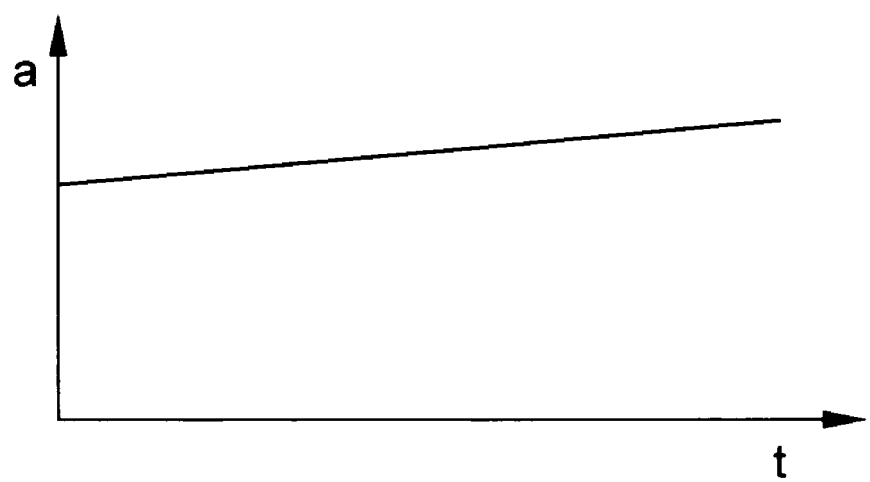
FIG. 6 is a graph illustrating an output signal of an acceleration sensor according to the invention plotted over time.
Figure 7:
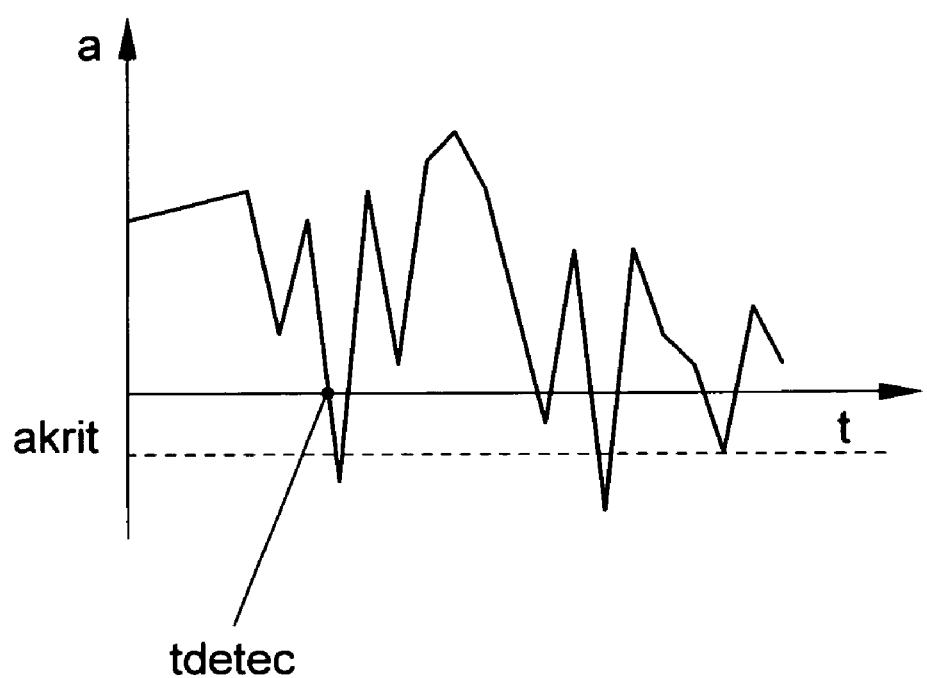
FIG. 7 is a further graph illustrating an output signal of an acceleration sensor according to the invention plotted over time.

Subsequent to step 31 is an inquiry 32 as to whether the acceleration value has changed its sign or, as in the present exemplary embodiment, whether the sign of the acceleration value is negative. Here, one makes use of the fact that the acceleration value a is proportional to the absolute value of the rotational speed n of the wheel 2 due to the arrangement of the acceleration sensor 23 with respect to the rotational axis 5 in the present case, as is illustrated in FIG. 5 and FIG. 6. Reference sign t indicates time in the graphs shown in FIGS. 5 and 6. If the tire pressure measuring module becomes detached then a course of the acceleration value a over time t as shown in FIG. 7 may for example be the result. In this case, the acceleration value a falls below the value zero at a time tdetec. It is also possible to provide for an inquiry as to whether the acceleration value a is smaller than a limit value akrit by using the inquiry 32.

If the inquiry 32 has the result that the sign of the acceleration value a is negative, then the inquiry 32 is followed by a step 33 according to which an alarm signal ARL is output. Otherwise, step 32 is followed by step 30. An alarm signal ARL as mentioned above can for example cause an acoustic and/or optical warning message to be issued and/or cause an acoustic and/or optical or visual command to be issued for reducing the speed of the motor vehicle 1 and, respectively, for stopping the motor vehicle 1.

In an advantageous embodiment of the invention, the fastening of the pressure-measuring device 21 in the tire can alternatively or additionally to the process as described with reference to FIG. 4 be checked by a comparison between the output signal of the acceleration sensor 22 and a plausibility quantity by using the seat diagnosis module 14. Such a plausibility quantity according to the invention is in particular the rotational speed of the wheel 2 which is indicated as $n_i$ below, a rotational speed $n_j$ of another wheel, the speed v of the motor vehicle 1 and/or the output signal of a further acceleration sensor, in particular of an acceleration sensor located in a further tire.

In this case, alternatively or additionally the rotational speed $n_i$ of the wheel 2, a rotational speed of another tire, the speed v of the motor vehicle 1 and/or the output signal $a_j$ of at least one acceleration sensor provided in a further tire are read in.

Also, by using inquiry 32 it is alternatively or additionally inquired whether:

$$|a_i| - |a_j| > \Delta a \tag{1}$$

$$\int_{t_0-t_1}^{t_0} (|a_i| - |a_j|) \, dt > \Delta a \cdot t_1 \tag{2}$$

$$|a_i| - |4 \cdot \pi^2 \cdot R_j \cdot n_j^2| > \Delta a \tag{3}$$

$$\int_{t_0-t_1}^{t_0} (|a_i| - |4 \cdot \pi^2 \cdot R_j \cdot n_j^2|) \, dt > \Delta a \cdot t_1 \tag{4}$$

$$|a_i| - |4 \cdot \pi^2 \cdot R_i \cdot n_i^2| > \Delta a \tag{5}$$

$$\int_{t_0-t_1}^{t_0} (|a_i| - |4 \cdot \pi^2 \cdot R_i \cdot n_i^2|) \, dt > \Delta a \cdot t_1 \tag{6}$$

$$|a_i| - \left|\frac{v^2}{R_i}\right| > \Delta a \tag{7}$$

$$\int_{t_0-t_1}^{t_0} \left(|a_i| - \left|\frac{v^2}{R_i}\right|\right) dt > \Delta a \cdot t_1 \tag{8}$$

In this case $R_i$ is the radius of the wheel 2, $R_j$ is the radius of the other wheel with the rotational speed $n_j$, $t_0$ is the current point in time, $t_1$ is a time period within which the wheel 2 has performed a thousand revolutions, and $\Delta a$ is a limit value, wherein for example the following applies:

$$\Delta a = \left|\frac{v^2}{5 \cdot R_i}\right| \tag{9}$$

Provided that the output signal of the acceleration sensor 22 is compared to an output signal $a_j$ of at least one acceleration sensor disposed in a further tire, then an advantageous embodiment of the invention provides for comparing the output signal of the acceleration sensor 22 with an output signal $a_j$ of each further acceleration sensor provided in a respective other tire.

According to an advantageous embodiment of the invention, the process described with reference to FIG. 4 is only performed if the speed v of the motor vehicle 1 is greater than a limit speed. A suitable limit speed is for example 20 kilometers per hour.

This application claims the priorities, under 35 U.S.C. § 119, of German patent application No. 10 2004 055 606.7, filed Nov. 18, 2004 and German patent application No. 10 2005 006 904.5, filed Feb. 16, 2005; the entire disclosure of these prior applications is herewith incorporated by reference.

LIST OF REFERENCE NUMERALS

1 motor vehicle
2 wheel
3 tire
4 rim
5 axis of rotation
10 tire pressure measuring module
11 monitoring module
12 receiver module
13 pressure monitoring module
14 seat diagnosis module
15 communications connection
17 valve
20 housing
21 pressure-measuring device
22 acceleration sensor
23 temperature sensor
24 transmitting device
30, 31, 33 step
32 inquiry
a acceleration value
akrit limit value
ARL alarm signal
n rotational speed
PR signal representing a pressure in a tire
t time
tdetec point in time

We claim:

1. In combination with a vehicle having an air-filled tire, a tire pressure control system, comprising:
    a pressure-measuring device disposed in the air-filled tire for one of determining and monitoring a pressure in the air-filled tire;
    an acceleration sensor connected to said pressure-measuring device, said acceleration sensor providing an output signal; and
    a seat diagnosis module configured to check a fastening of said pressure-measuring device in the air-filled tire in dependence of the output signal of said acceleration sensor.

2. The tire pressure control system according to claim 1, wherein said seat diagnosis module checks the fastening of said pressure-measuring device in the air-filled tire by monitoring a change in sign of the output signal of said acceleration sensor.

3. The tire pressure control system according to claim 1, wherein said seat diagnosis module checks the fastening of said pressure-measuring device in the air-filled tire by comparing the output signal of said acceleration sensor to a plausibility quantity.

4. The tire pressure control system according to claim 2, wherein said seat diagnosis module checks the fastening of said pressure-measuring device in the air-filled tire by comparing the output signal of said acceleration sensor to a plausibility quantity.

5. The tire pressure control system according to claim 1, including:
   a housing; and
   said pressure-measuring device and said acceleration sensor being embedded together in said housing.

6. The tire pressure control system according to claim 1, wherein the air-filled tire defines a rotation axis, said acceleration sensor is disposed in said air-filled tire such that said acceleration sensor measures an acceleration in a direction substantially radial with respect to the rotation axis of the air-filled tire.

7. The tire pressure control system according to claim 1, wherein said seat diagnosis module is disposed outside the air-filled tire.

8. A motor vehicle, comprising:
   an air-filled tire;
   a tire pressure control system including a pressure-measuring device and a seat diagnosis module;
   said pressure-measuring device being disposed in said air-filled tire for one of determining and monitoring a pressure in said air-filled tire;
   an acceleration sensor connected to said pressure-measuring device, said acceleration sensor providing an output signal; and
   said seat diagnosis module being configured to check a fastening of said pressure-measuring device in said air-filled tire in dependence of the output signal of said acceleration sensor.

9. A method for operating a tire pressure control system, the method which comprises:
   using a pressure-measuring device disposed in an air-filled tire of a vehicle for one of determining and monitoring a pressure in the air-filled tire; and
   checking whether the pressure-measuring device is fastened in the air-filled tire based on an output signal of an acceleration sensor connected to the pressure-measuring device.

10. The method according to claim 9, wherein the acceleration sensor is embedded together with the pressure-measuring device in a housing.

* * * * *